United States Patent
O'Brien et al.

(10) Patent No.: US 8,425,771 B2
(45) Date of Patent: *Apr. 23, 2013

(54) DOUBLE CHAMBER WATER PURIFICATION DEVICE

(75) Inventors: Paul W. O'Brien, Nicholson, PA (US); Mogens Engel, Tunkhannock, PA (US)

(73) Assignee: Miracle Straw Corporation, Inc., Nicholson, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/012,469

(22) Filed: Jan. 24, 2011

(65) Prior Publication Data

US 2011/0284479 A1    Nov. 24, 2011

Related U.S. Application Data

(63) Continuation of application No. PCT/US2009/051776, filed on Jul. 24, 2009.

(51) Int. Cl.
| | |
|---|---|
| B01D 35/00 | (2006.01) |
| B01D 29/62 | (2006.01) |
| B01D 29/88 | (2006.01) |
| B01D 35/22 | (2006.01) |
| C02F 9/00 | (2006.01) |

(52) U.S. Cl.
USPC ............ 210/200; 210/94; 210/106; 210/108; 210/117; 210/136; 210/416.3; 210/236; 210/238; 210/258; 210/335; 210/398

(58) Field of Classification Search .......... None
See application file for complete search history.

(56) References Cited

U.S. PATENT DOCUMENTS

| | | | |
|---|---|---|---|
| 472,547 A * | 4/1892 | Nordtmeyer ............ 210/416.3 |
| 1,000,332 A | 8/1911 | Dyer |
| 1,386,450 A | 8/1921 | Woster |
| 3,608,736 A | 9/1971 | Wong |
| 3,870,639 A | 3/1975 | Moore et al. |
| 3,932,277 A | 1/1976 | McDermott et al. |
| 4,151,092 A | 4/1979 | Grimm et al. |
| 4,298,475 A | 11/1981 | Gartner |
| 4,477,347 A | 10/1984 | Sylva |
| 4,529,511 A | 7/1985 | Breeden et al. |
| 4,632,757 A | 12/1986 | Rosenberg |
| 4,643,981 A | 2/1987 | Card |
| 4,717,476 A | 1/1988 | Scott |

(Continued)

FOREIGN PATENT DOCUMENTS

| | | |
|---|---|---|
| JP | 60122016 | 6/1985 |
| WO | WO 82/00256 | 2/1982 |
| WO | WO 91/10494 | 7/1991 |
| WO | WO 97/40906 | 11/1997 |

*Primary Examiner* — Benjamin Kurtz
(74) *Attorney, Agent, or Firm* — Clinton H. Wilkinson; Charles A. Wilkinson

(57) ABSTRACT

A portable device for filtering and purifying water comprised of an outer chamber and an inner chamber that is slidable within a section of the outer chamber, and a small pore size pre-filter, whereby water is drawn through the pre-filter into the first container section of the outer chamber where it is isolated and treated with a disinfectant agent, then is drawn out of the first container section and into the second container section, and then into the inner chamber, where it is passed across another filtering material such as an activated carbon bed, removing any remaining contaminants before the potable water exits through a mouthpiece.

12 Claims, 9 Drawing Sheets

U.S. PATENT DOCUMENTS

| | | |
|---|---|---|
| 4,769,143 A | 9/1988 | Deutsch et al. |
| 4,800,018 A | 1/1989 | Moser |
| 4,816,149 A | 3/1989 | Wekell |
| 4,828,698 A | 5/1989 | Jewell et al. |
| 4,832,850 A | 5/1989 | Cais et al. |
| 4,832,851 A | 5/1989 | Bowers et al. |
| 4,859,336 A | 8/1989 | Savas et al. |
| 4,891,134 A | 1/1990 | Vcelka |
| 4,962,044 A | 10/1990 | Knesel, Jr. et al. |
| 4,995,976 A | 2/1991 | Vermes et al. |
| 5,045,195 A | 9/1991 | Spangrud et al. |
| 5,078,876 A | 1/1992 | Whittier et al. |
| 5,106,500 A | 4/1992 | Hembree et al. |
| 5,120,437 A | 6/1992 | Williams |
| 5,122,272 A | 6/1992 | Iana et al. |
| 5,156,335 A | 10/1992 | Smith et al. |
| 5,156,737 A | 10/1992 | Iana et al. |
| 5,167,819 A | 12/1992 | Iana et al. |
| 5,268,093 A | 12/1993 | Hembree et al. |
| 5,273,649 A | 12/1993 | Magnusson et al. |
| 5,362,385 A | 11/1994 | Klegerman et al. |
| 5,366,642 A | 11/1994 | Platter et al. |
| 5,433,848 A | 7/1995 | Platter et al. |
| 5,456,831 A | 10/1995 | Sullivan |
| 5,509,605 A | 4/1996 | Cripe |
| 5,518,613 A | 5/1996 | Koczur et al. |
| 5,534,145 A | 7/1996 | Platter et al. |
| 5,549,816 A | 8/1996 | Harp et al. |
| 5,569,374 A | 10/1996 | Williams |
| 5,656,160 A | 8/1997 | Parise et al. |
| 5,685,980 A | 11/1997 | Patapoff et al. |
| 5,688,588 A | 11/1997 | Cotton et al. |
| 5,709,794 A | 1/1998 | Emmons et al. |
| 5,733,448 A | 3/1998 | Kaura |
| 5,919,357 A | 7/1999 | Wilkins et al. |
| 5,928,512 A | 7/1999 | Hatch et al. |
| 5,981,293 A | 11/1999 | Charlton |
| 6,010,626 A | 1/2000 | D'Agostino |
| 6,136,188 A | 10/2000 | Rajan et al. |
| 6,142,384 A | 11/2000 | Shafik |
| 6,193,886 B1 | 2/2001 | Nohren, Jr. |
| 6,200,471 B1 | 3/2001 | Nohren, Jr. |
| 6,344,146 B1 | 2/2002 | Moorehead et al. |
| 6,478,956 B2 | 11/2002 | Kaura |
| 6,569,329 B1 | 5/2003 | Nohren, Jr. |
| 6,733,669 B1 | 5/2004 | Crick |
| 6,811,036 B1 | 11/2004 | Vaiano et al. |
| 6,887,379 B2 | 5/2005 | Schiltz |
| 6,919,025 B2 | 7/2005 | Cluff et al. |
| 7,066,336 B2 | 6/2006 | Keeping et al. |
| 7,226,542 B2 | 6/2007 | Zemel et al. |
| 7,390,340 B1 | 6/2008 | Schopf, Jr. |
| 7,402,239 B2 | 7/2008 | Dorward |
| 7,413,653 B2 | 8/2008 | Powell |
| 7,438,801 B2 | 10/2008 | Scaringe |
| 7,476,312 B2 | 1/2009 | Laing et al. |
| 7,507,338 B2 | 3/2009 | Bommi et al. |
| 2003/0106851 A1 | 6/2003 | Tremblay et al. |
| 2004/0040906 A1 | 3/2004 | Jagtoyen et al. |
| 2004/0144711 A1 | 7/2004 | Cluff et al. |
| 2005/0035041 A1 | 2/2005 | Nohren, Jr. et al. |
| 2005/0082320 A1 | 4/2005 | Anue |
| 2005/0133427 A1 | 6/2005 | Rinker et al. |
| 2006/0060530 A1 | 3/2006 | Ali |
| 2006/0124517 A1 | 6/2006 | Scaringe |
| 2006/0157398 A1 | 7/2006 | Nohren, Jr. |
| 2007/0163943 A1 | 7/2007 | Collins et al. |
| 2007/0199875 A1 | 8/2007 | Moorey et al. |
| 2008/0011662 A1 | 1/2008 | Milosavljevic et al. |
| 2008/0017565 A1 | 1/2008 | Yanou et al. |
| 2008/0093303 A1 | 4/2008 | Tremblay et al. |
| 2008/0197062 A1 | 8/2008 | Collins et al. |
| 2009/0127178 A1 | 5/2009 | Kuo |

* cited by examiner

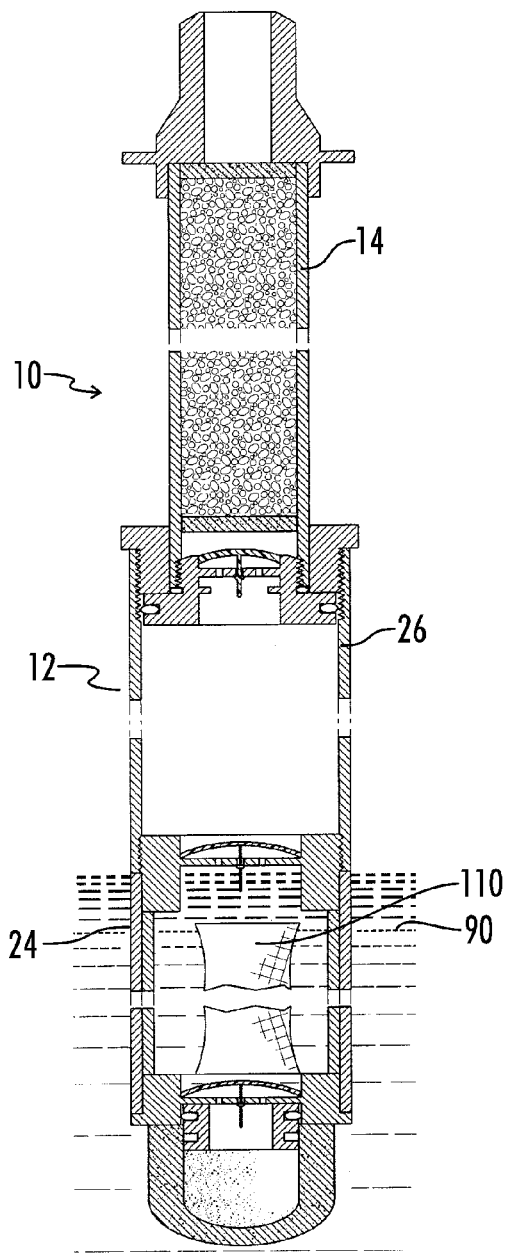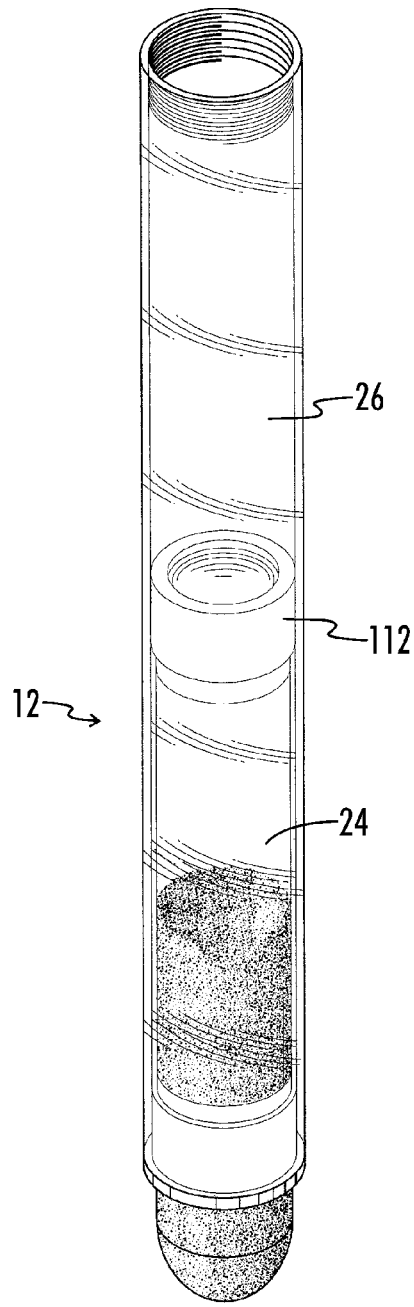
*FIG. 12*          *FIG. 13*

DOUBLE CHAMBER WATER PURIFICATION DEVICE

BACKGROUND OF THE INVENTION

1. Field of the Invention

The present invention relates to devices for converting contaminated or impure water into potable or pure drinking water, and more particularly to a portable water filtering and purifying device having a plurality of separate chambers wherein the water is initially isolated in a first chamber and immersed in a disinfecting agent, and then is transferred to another chamber for further filtering and/or purifying, and more particularly still to a portable water filtering and purifying device that is customizable with particular treating agents to simply and easily remove specific contaminants from a water supply.

2. Description of Related Art

Contaminated drinking water is a leading cause of health problems and concerns throughout the world. While such problems and concerns are encountered by millions on a daily basis, particularly in less developed countries, ensuring the safety of a supply of water is also an important concern for soldiers, hikers, international travelers and others. Various waterborne diseases are commonly found in untreated water, caused by microbial agents including protozoan parasites that cause Giardiasis and Cyclosporasis, and *Crytosporidium parvum*, viruses such as the hepatitis A and other viruses, and bacteria such as *E. coli, salmonella typhi* which causes Typhoid fever, *Vibrio cholerae*, and *shigella* species. Symptoms include fever and diarrhea, rashes, cramps, jaundice, liver disease as well as other diseases, and while in many cases such ailments can be treated if attended to quickly, if not treated can worsen and cause permanent serious conditions and often death, particularly in the young and elderly, as well as those having compromised immune systems.

In addition to concerns related to untreated water, treated water supplies may also contain contaminants. While in developed countries most cities and large towns have large piped water systems for continually transporting relatively high quality treated water to users, such tap water is only safe to drink if it has been fully treated and disinfected, and if the water system is well operated and maintained. Bottled-water is also becoming increasingly popular, and although usually presumed to be safe by most users, may also be contaminated not only by microbial hazards such as those already mentioned above but also by any number of chemical and physical hazards. Possible chemical hazards include heavy metal ions, lead, arsenic and benzene, while physical hazards include glass chips and metal fragments.

A variety of portable devices for filtering and purifying water from untreated sources such as lakes and streams, improperly maintained piped water supplies, and other sources, to make such water potable are found in the prior art. For example, numerous portable straw-type devices wherein the user places his or her mouth over one end of an elongated casing and sucks inwardly in the same manner as with a conventional drinking straw, causing the water to pass across or through a filter in the device, are known. Also known are gravity-activated filter assemblies having at least two compartments through which water is passed to remove various particulates, organisms, and ions. A significant disadvantage of mouth suction and gravity activated filtering and purifying devices, however, is that there is a practical limit to the pore size of the openings in the filter elements used, measured in microns, which pore size determines what size particles are prevented from passing through the filter. While filters having as small pore sizes as possible are obviously more desirable, since more microbial and other contaminants will thereby be filtered from the water, if the pore size of the filter is made too small, it becomes impossible for the user to pass a meaningful amount of water through the filter and straw merely by mouth suction or gravity pressure. For example, while a maximum pore size of 4.0 microns will filter out *Giardia* cysts, a maximum pore size of 0.2 microns is required to filter out bacteria, which generally have a size of between 0.2 and 10 microns. Viruses, which typically range in size from 0.0004 to 0.1 microns, are too small to be filtered out by most filters, but many viruses will attach themselves to a larger host bacteria, and these viruses can be removed by removing the host bacteria. Even where a pre-filter is used to filter out larger particles that would immediately clog the main filter, the smaller the pore size of the main filter, the more quickly it will become clogged and ineffective. Several pressurized filtering and purifying devices are known, but they are bulky and inconvenient to carry and use and thus are not truly portable.

The use of granulated activated carbon (GAC) as a water filtration media is well known, since activated carbon is efficient in removing or filtering out small contaminants from water. However, bacteria and viruses in the water can grow in the carbon bed, and activated carbon as a filter means does not work well with heavy metals, as well as certain chemicals such as alcohols, glycols, strong acids and bases. Thus, other agents for destroying certain viruses and bacteria, as well as for eliminating heavy metals and other contaminants are also known.

A further problem with water filters having small pore sizes is that they quickly become clogged with contaminants and materials that have been removed from the water. As a result, many such filters must be replaced continually with a new, clean filter, since even if, for example, the filter is sterilized by dipping it in a disinfecting solution such as bleach to kill harmful parasites and the like in the filter, such contaminants although possibly no longer harmful if ingested, nevertheless remain trapped in and clogging the filter cartridge. Thus, the cost of such filters is problem, particularly in less wealthy countries wherein while persons having a filtering device can avail themselves to a supply of clean and potable water as long as the device contains a new filter, once the filter become clogged either the user must have a replacement filter available, which is expensive, impractical, and unlikely, or the device will be rendered useless. The present inventor, recognizing the problems associated with existing portable water filtering and purifying devices, has now developed an improved water filtering and purifying device that can be carried easily in a backpack, bag, or clothing pocket and that can be used with filters having pore sizes small enough to filter out some viruses, down to 1 micron, thus removing virtually all contaminants from the water. In such device the present inventor has also provided an arrangement for clearing contaminants and materials from the filter device quickly and easily, thereby making the filter reusable and extending its life more or less indefinitely. Such improvements are provided by the present device which not only can pump or force water through filters having smaller pore sizes than would be possible with only manual suction, but in addition said same pumping action can be used to force contaminants and other materials clogging the filter out of such filter so that the device is ready to be reused.

OBJECTS OF THE INVENTION

It is therefore a primary object of the present invention to provide a portable water filtering and purifying device by which a supply of potable water can be obtained from a contaminated water supply.

It is a further object of the present invention to provide a water filtering and purifying device that can is capable of using very small pore size filters, enabling a maximum number of contaminants to be removed from the water.

It is a still further object of the present invention to provide a water filtering and purifying device wherein the water is initially passed into a first chamber where it is isolated and immersed in a disinfectant agent, then is forced into a second chamber whereby the disinfectant agent is removed, and then is forced into a third chamber containing an activated carbon filter which removes any remaining particulate matter.

It is a still further object of the present invention to provide a portable water purifying device comprised of an outer receptacle and an inner receptacle that is slidable within a section of said outer receptacle, whereby through a pumping action, water is first pulled into the lower section of said outer receptacle, where it is treated with a disinfecting agent or agents, then is moved into the upper section of the outer receptacle, and then is moved forcibly by a pumping action into said inner receptacle, where it is passed or physically forced across a filter, and finally is passed out of the inner receptacle through a mouth piece.

It is a still further object of the present invention to produce a potable water supply utilizing an apparatus comprised of tubular components similar to a large mechanical straw and a pumping action.

It is a further object of the present invention to provide a mechanical forced pumping apparatus for sterilizing and purifying a contaminated water supply, which device can be carried in a persons breast pocket or other gear similar to a large pencil or pen.

It is a further object of the present invention to provide a water filtering device in accordance with the above objects wherein in addition a clogged water filter in said apparatus can be cleaned of debris by pumping water through said filter in a reverse direction.

Still other objects and advantages of the invention will become clear upon review of the following detailed description in conjunction with the appended drawings.

SUMMARY OF THE INVENTION

A portable device for filtering and purifying water prior to drinking such water is disclosed. The device accomplishes this by a pumping action and is comprised an outer chamber and an inner chamber that is slidable within a section of the outer chamber, with an airtight seal between the chambers. The outer chamber is comprised of preferably separable first and second container sections, with a pre-filter attached to the lower end of the first container section, and one-way check valves and additional filter members situated between the ends of the container sections and inner chamber so that water can only travel in one direction through the device. In use, the device is held with the lower end of the outer chamber first container section being immersed in a presumably contaminated water supply. The inner chamber is slid upwardly out of the second container section of the outer chamber, which causes water to be drawn into the first container section of the outer chamber via suction created by the vacuum resulting from such movement. While in the first container section, the water is treated with a desired or customized disinfectant agent to sterilize such water supply. Then, the inner chamber is slidingly moved back into the second container section of the outer chamber, and then slid out again, which causes the water supply to be drawn out of the first container section and into the second container section. The inner chamber is again moved back into the second container section, the force of which movement causes the water to flow through the one-way valve into the inner chamber, where it is forced across another filtering material, preferably containing a plurality of activated carbon granules, that removes any remaining contaminants, after which the treated water is forced out through a mouthpiece on the end of the device.

BRIEF DESCRIPTION OF THE DRAWINGS

FIG. 12 is a cross-sectional view showing water drawn into the bottom section of the outer chamber in the second embodiment of the present invention.

FIG. 13 is a side perspective view of a third embodiment of the outer chamber of the present invention.

DESCRIPTION OF THE PREFERRED EMBODIMENTS

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

Figure 11:
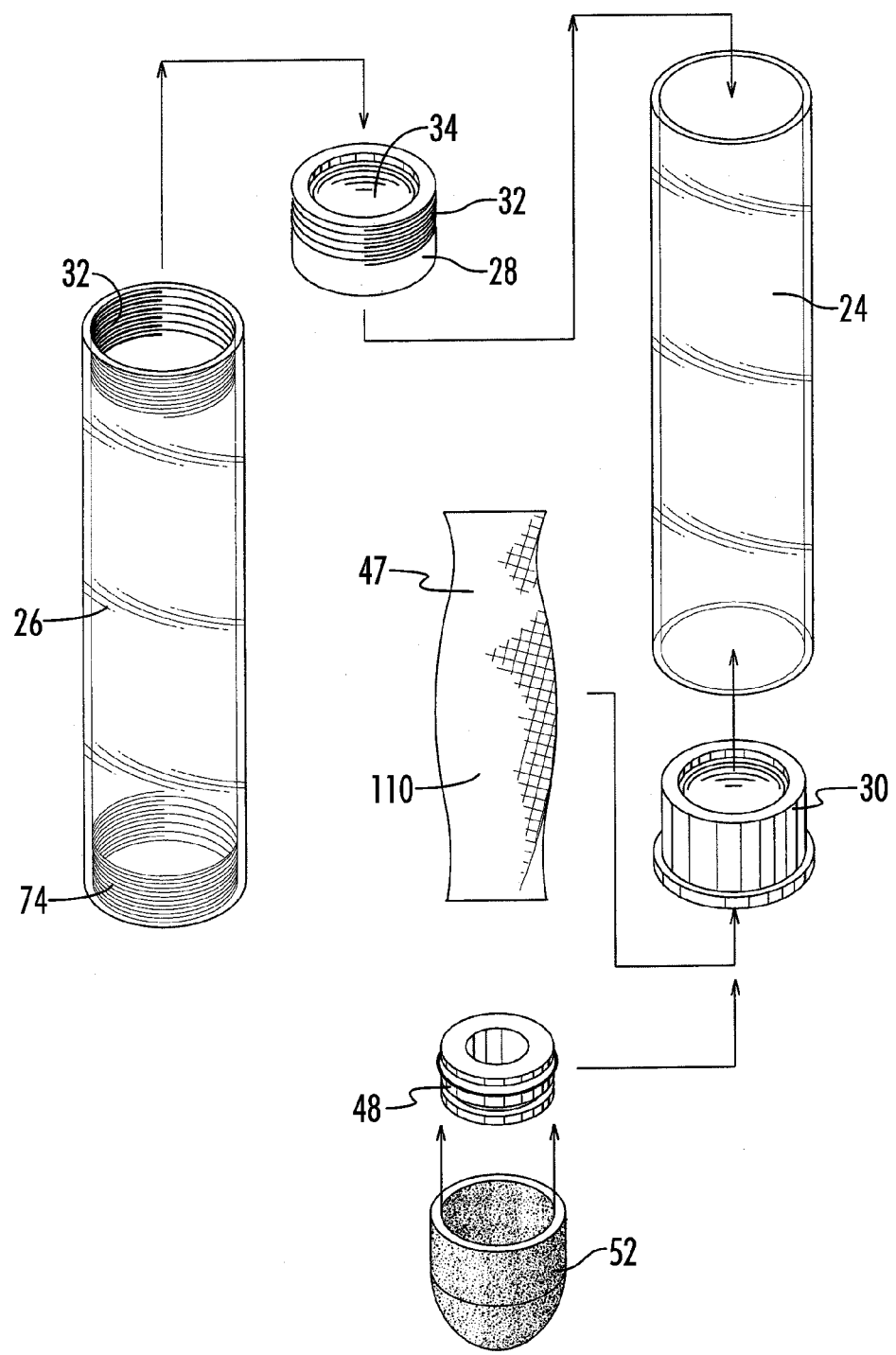
FIG. 11 is an exploded view of a second embodiment of the outer chamber of the present invention.
Figure 14:
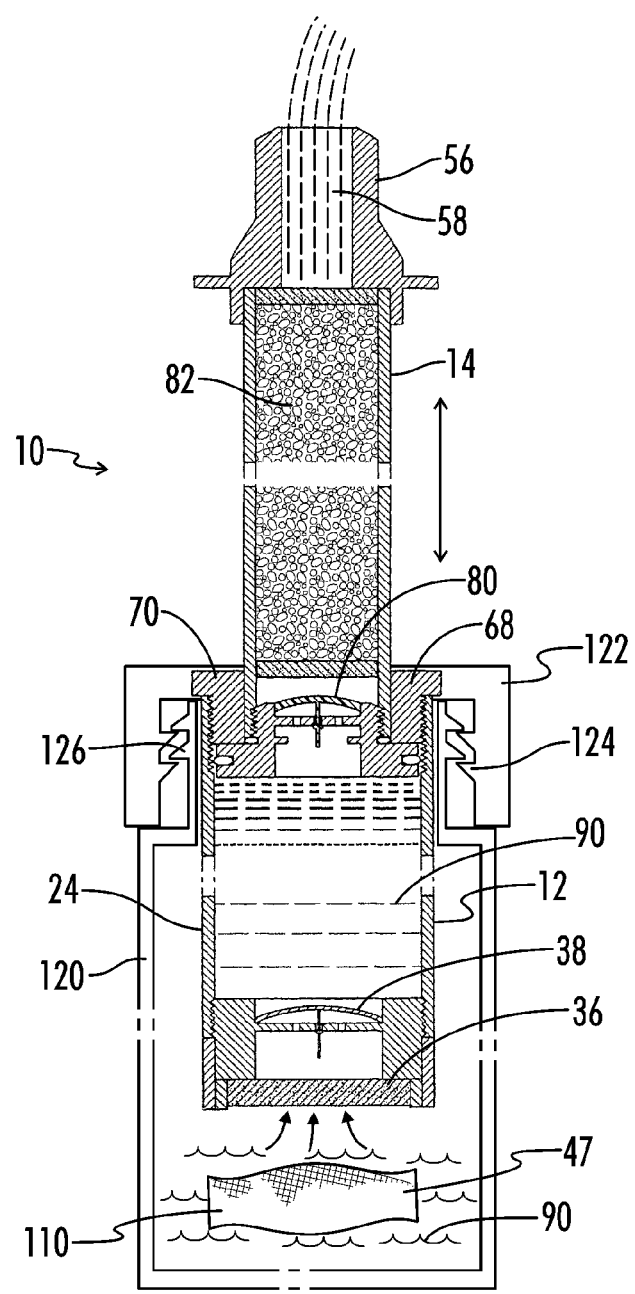
FIG. 14 is a cross-sectional view of another embodiment showing the device in use with a water container such as a canteen.

FIGS. 1-10 illustrate a first preferred embodiment of the water disinfecting and purifying device of the present invention, FIGS. 11-12 illustrate an alternative disinfecting agent system, FIG. 13 illustrates an alternative embodiment of the outer receptacle or chamber of the invention, and FIG. 14 illustrates one manner of use of the device with a canteen or water container. Reference will now be made in detail to several preferred implementations of the present invention as illustrated in the accompanying drawings. Wherever possible, the same reference numbers will be used throughout the drawings and the following description to refer to the same or like parts.

Figure 4:
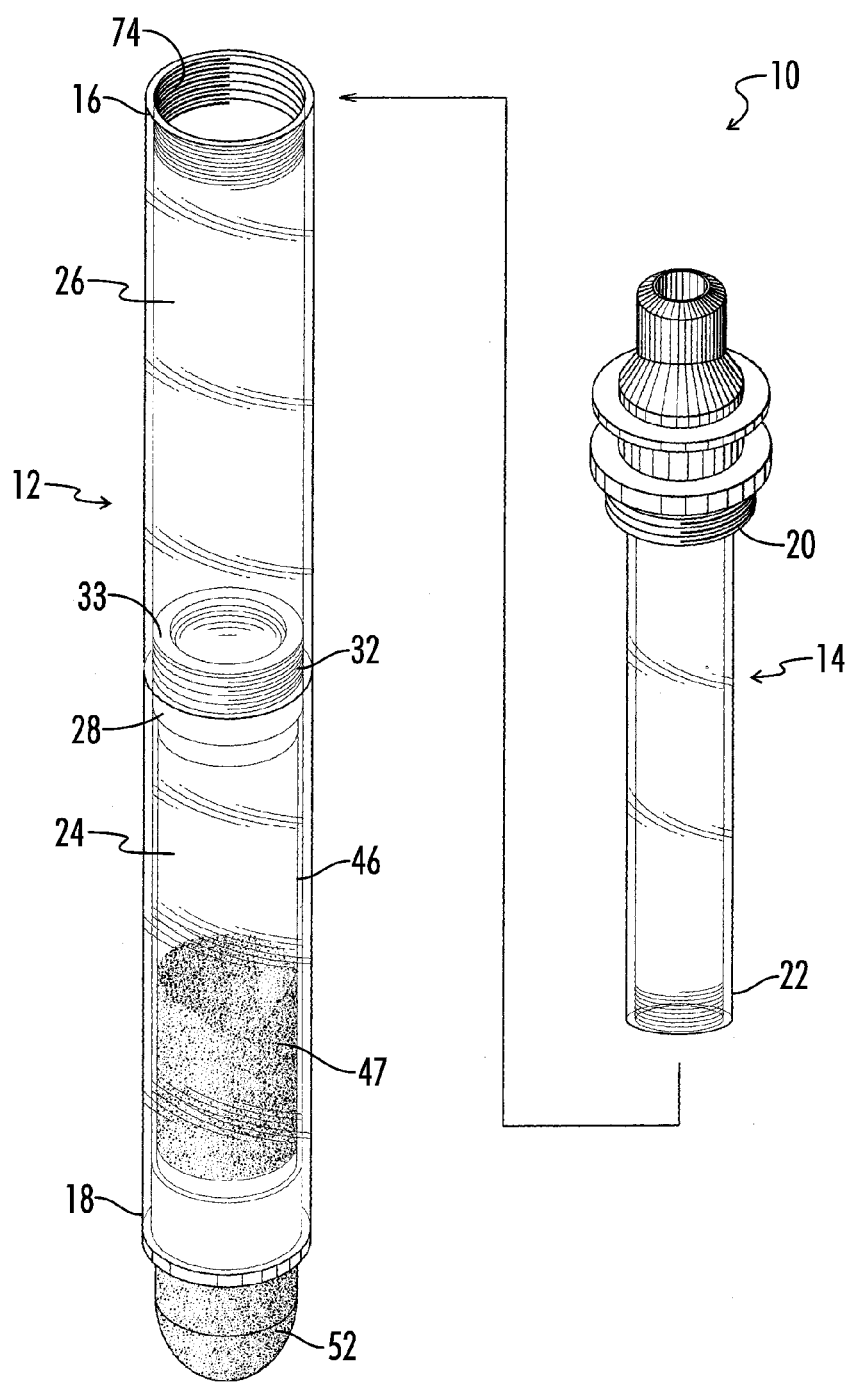
FIG. 4 is a side perspective view of the inner and outer chambers of the water purifying and disinfecting device of the invention.

Referring first to FIG. 4, portable water purifying and disinfecting device 10 is comprised of an outer chamber or receptacle 12 and an inner chamber or receptacle 14 that is telescopingly slidable within at least a portion of said outer chamber 12 in an airtight manner. Receptacle 12 has an upper end 16 and a lower end 18; similarly, receptacle 14 has an upper end 20 and a lower end 22. As shown, chambers or receptacles 12 and 14 are made of a plastic material such as polypropylene, and preferably are in the form of cylinders; however, while the shown arrangement is convenient, such chambers or receptacles could be made from other materials, and furthermore do not have to be tubular and could have other shapes such as triangular, rectangular, or other geometric shapes while still falling within the scope and accomplishing the intended objects and purposes of the invention. In addition, the length and size of the chambers can be varied, although in a preferred embodiment device 10 is made to be portable and carried conveniently on one's person in a shirt pocket, bag, duffel bag, or the like to filter relatively small amounts of water at a time, while in another embodiment the device is large enough to filter greater quantities of an aqueous solution, such as sixteen or twenty-four ounces of liquid at a time or significantly more.

Figure 3:
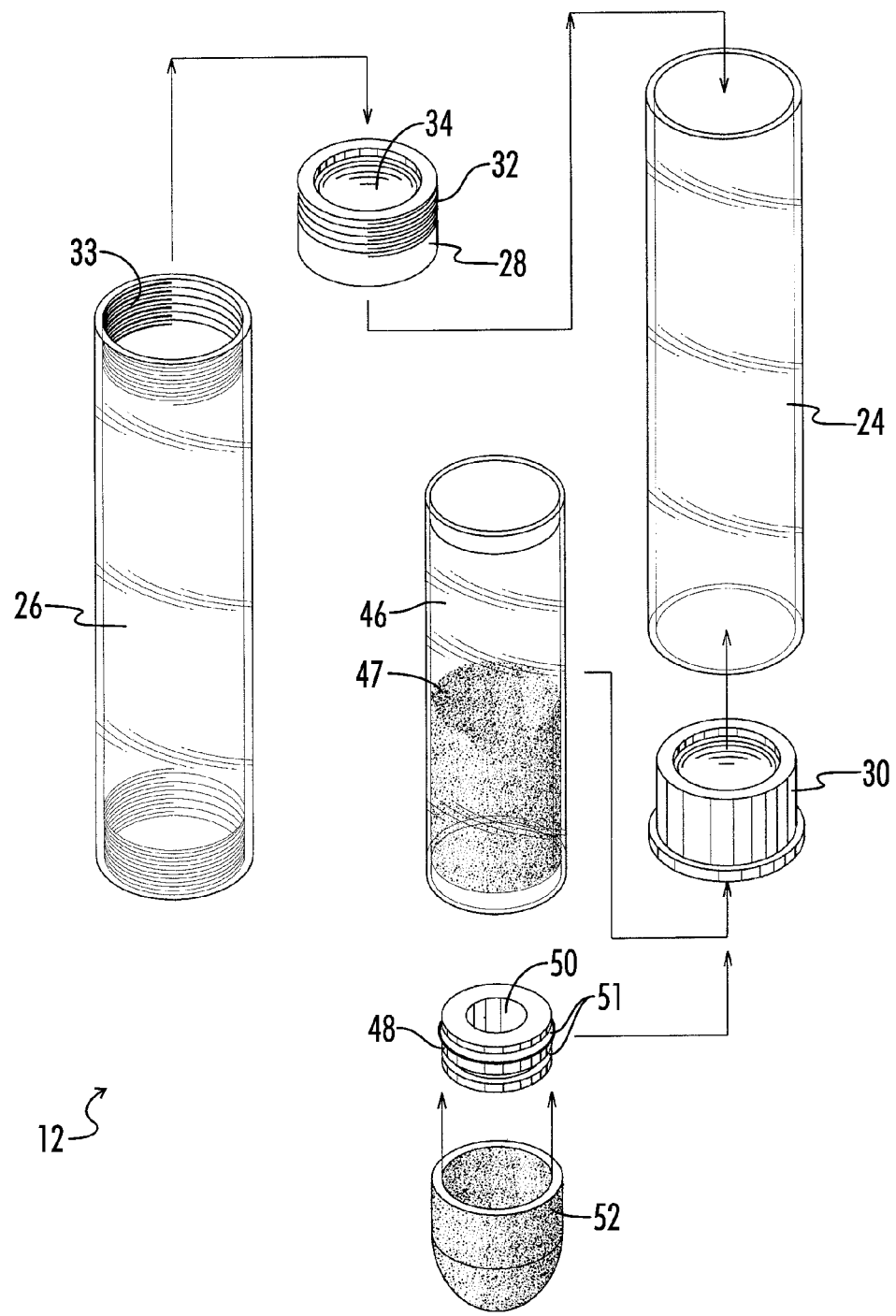
FIG. 3 is a side exploded view of the components of the outer chamber of the water purifying and disinfecting device of the present invention.

As is shown in FIG. 3, outer chamber or receptacle 12 is comprised of a first container section or compartment 24 and a second container section or compartment 26. Insert or plug 28 is snugly secured in the upper end of first container section 24, while insert or plug 30 is snugly secured in the lower end of first container section 24. Insert 28 includes male threads 32, which when such insert 28 is secured in the upper end of first container section 24 protrude out of such upper end so that as shown in FIG. 4 the threads 32 can be engaged with female threads 33 on the inner lower end of second container section 26 in an end-to-end relationship. Threads 32 and 33 also enable first and second container sections 24 and 26 to be threadably associated and disassociated from each other as desired, such as for storage and transportation purposes, or cleaning or other additional purposes as will be explained below. As shown in FIG. 13, outer chamber 12 may also be comprised of a unitary cylindrical chamber so that sections 24 and 26 cannot be disassociated from each other, with insert or plug 112 being permanently secured between such sections.

Figure 5:
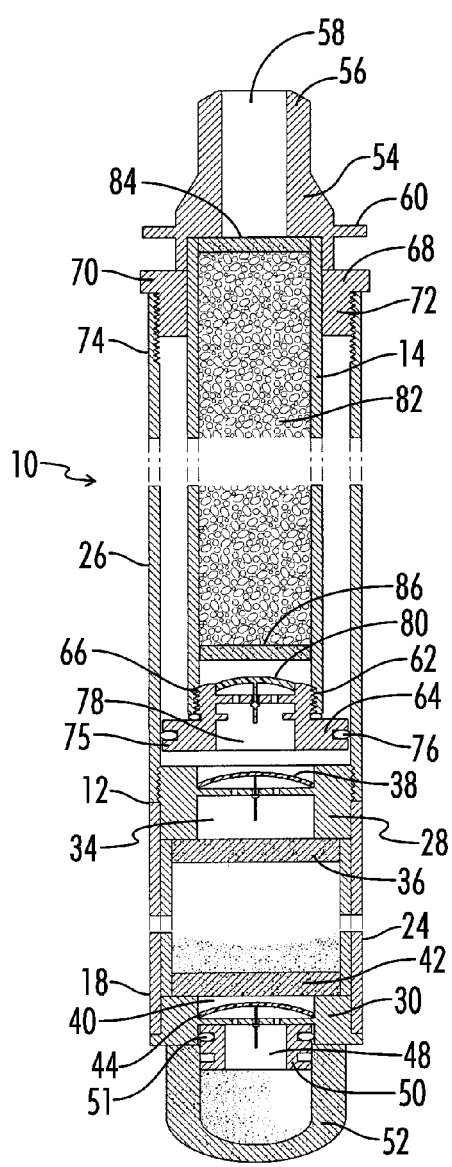
FIG. 5 is a cross-sectional view of the water purifying and disinfecting device of the invention.

Referring now to the cross-sectional view of device 10 in FIG. 5, insert 28 includes a central passageway 34 the mouth of which is covered by filter member 36, while a one-way check valve 38 is mounted in passageway 34 such that aqueous solutions in first container section 24 can flow into second container section 26, but aqueous solutions in second section 26 are prevented by such one-way valve 38 from flowing in a reverse direction into first container section 24. Similarly, insert 30 (see also FIGS. 3 and 4) secured to the lower end 18 of outer chamber or receptacle 12 has a central passageway 40 the mouth of which is covered by filter member 42, and a one-way check valve 44 is mounted in passageway 40 such that an aqueous solution can flow into first container section 24 of outer chamber 12 through passageway 40, but cannot flow in a reverse direction out passageway 40. In addition, as shown in FIGS. 3 and 4, a cartridge 46 containing at least one disinfectant agent 47 is placed in first container section 24 of outer receptacle 12. Sleeve 48 having a central bore 50 and at least one gasket or sealing ring 51 secured in an aperture on its outer periphery is tightly secured in aperture 40 in the lower end of insert 30, to the lower end of which sleeve 48 pre-filter 52 is connected by a means known to those of ordinary skill in the art, such as threads or a friction fit. Pre-filter 52 can be made of various porous substances such as polypropylene or ceramic material, and while a main purpose of pre-filter 52 is to prevent particulate matter, sediment and like larger size contaminants from entering first container section 24 of outer chamber 12 through check valve 44 and clogging up such valve as well as filter member 42, as is described in greater detail below, due to the large amount of suction that is generated through use of device 10, pre-filter 52 can have a very small pore size such as five to ten microns or smaller and still allow water to be easily drawn through such pre-filter into first container section 24, thereby eliminating a much larger percentage of contaminants from ever entering device 10.

Figures 1, 2:
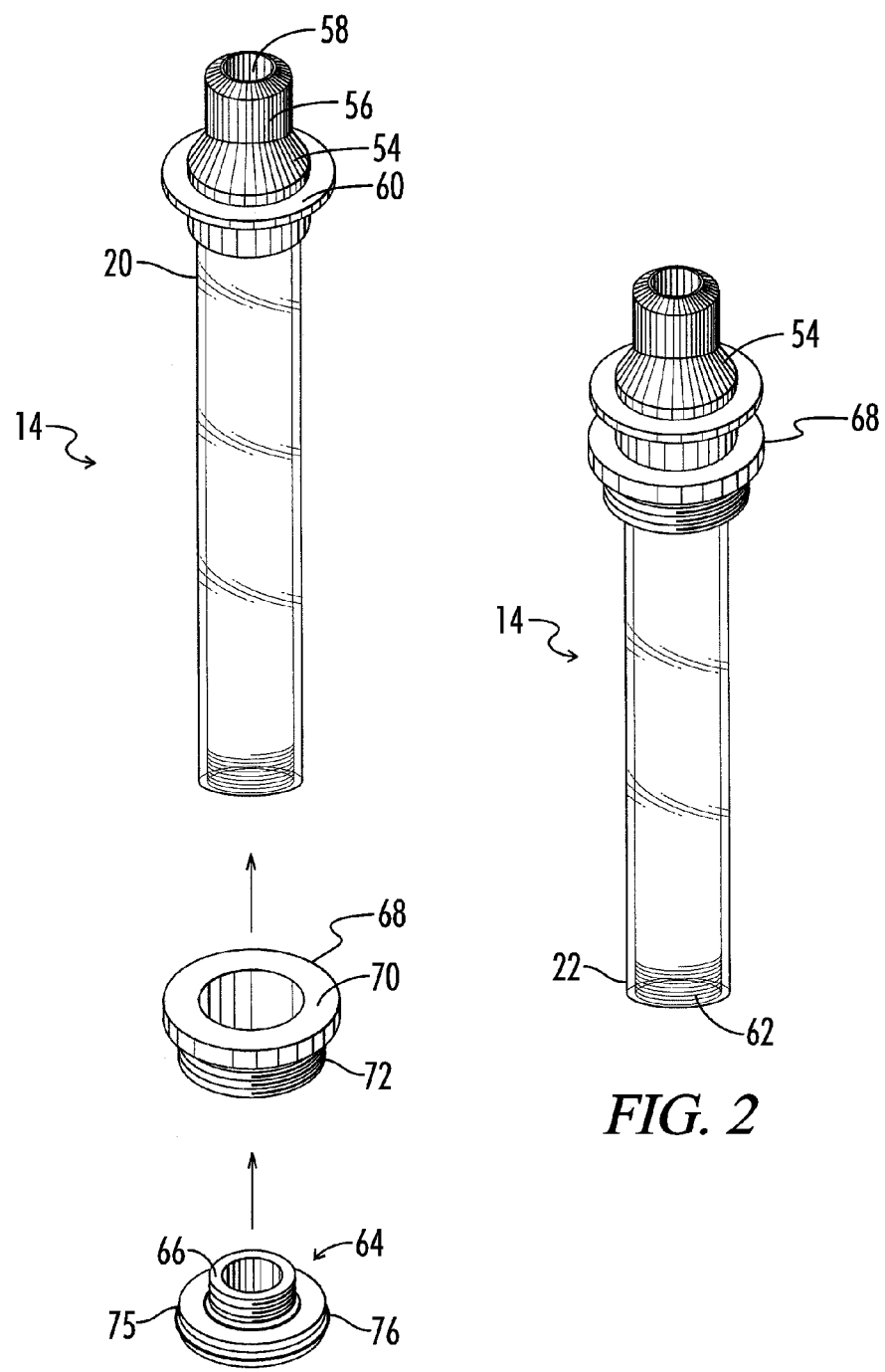
FIG. 1 is a side perspective partially exploded view of the components of inner chamber of the water purifying and disinfecting device of the present invention.
FIG. 2 is a side perspective view of the inner chamber shown in FIG. 1 with the cap for the outer chamber slidably shown thereon.

Referring now in particular to FIGS. 1 and 2, which illustrate the basic components of inner chamber or receptacle 14, cap member 54 is secured to the upper end 20 of inner chamber or receptacle 14. Cap member 54 includes a mouthpiece 56 having an internal orifice 58 through which disinfected and purified water exits device 10 as will be explained below. In addition, cap member 54 also has a peripheral lip 60 which flares outwardly from the exterior surface of the cap, and greatly facilitates manual gripping of inner chamber 14 and telescopingly sliding such receptacle 14 in and out of second container section 26 of outer chamber 12 as will be described in greater detail below. Female threads 62 are situated on the inner surface of lower end 22 of inner chamber 14, and are adapted to receive male threads 66 on plug 64. A collar member 68 having a rim section 70 and a male threaded section 72 is also provided, which is secured over the outer surface of inner chamber 14 (see FIG. 2), and which threaded section 72 as best shown in FIG. 5 engages with female threads 74 on the upper end 16 of outer chamber 12 with such upper end 16 pressed tightly against the underside of rim section 70, and inner chamber 14 as a result being telescopingly secured to outer chamber 12. Plug 64 also has a rim section 75 with a gasket or sealing member 76 on its outer periphery such that when inner chamber 14 is moved slidingly in second container section 26 of outer chamber 12, gasket or sealing member 76 engages and provides an airtight seal with the inner surface of container section 26 of chamber or receptacle 14. In addition, plug 64 has an internal passageway 78 (see FIG. 5) in which one-way check valve 80 is secured which allows an aqueous solution to flow from second container section 26 of outer chamber 12 into inner chamber 14 through passageway 78, but prevents an aqueous solution from flowing in a reverse direction through passageway 78 from inner chamber 14 into second container section 26 of outer chamber 12.

Figure 6:
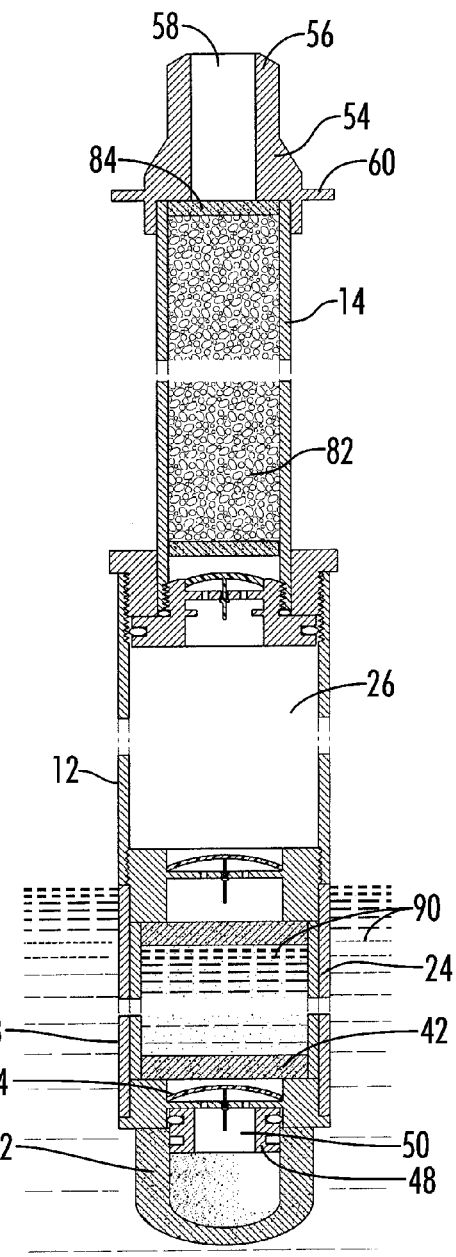
FIG. 6 is a cross-sectional view showing water being drawn into the bottom compartment of the outer chamber.

As is shown in FIGS. 5-10, a purifying substance 82, which is preferably a granular activated carbon (GAC) bed, is housed in inner chamber 14 adjacent the mouth to orifice 58 in cap 54 leading to mouthpiece 56, and is prevented from spilling out of chamber 14 through orifice 58 by porous member 84 and separated from check valve 80 by another porous member 86. Alternatively, the granular activated carbon may be completely housed in a separate container which is inserted in inner chamber 14 and preferably also placed adjacent to or secured to cap 54. Thus, before liquid is passed out of mouthpiece 56 it first must pass through carbon bed 82, which captures by adsorption virtually all remaining particulates in the aqueous solution. Starting now with FIG. 5, a preferred manner of use of water disinfecting and purifying device 10 will be described. In FIG. 5, inner chamber 14 is fully contained in second container section 26 of outer chamber 12, which is a preferred starting position for commencing use of device 10. Next, as illustrated in FIG. 6, the lower end 18 of outer chamber 12 including pre-filter 52 is lowered into a water supply 90 to be rendered potable by device 10. Inner chamber 14 is next manually pulled or moved upwardly out of second container section 26 of outer chamber 12, which movement creates a negative air pressure and suction in second container section 26 of outer chamber 12 that causes water 90 to be drawn upwardly through the pores in pre-filter 52, and then also through bore 50 in plug 48 and past check valve 44 into the lower end 18 of first container section 24 of outer chamber 12. Depending on the size of first container section 24 in relation to second container section 26 and inner chamber 14, inner chamber 14 may be drawn in and out of second container section 26 two or more times to draw enough water in first container section 24 to substantially fill such container section. As the water is drawn into first container section 24, it is filtered not only by pre-filter 52 but also filter member 42 in mouth 40 of insert 30 after passing through one-way valve 44, which in one embodiment is made of polypropylene and has a 150 micron pore size, although different types of filters or filters having larger or more preferably smaller micron pores sizes may be utilized. As indicated above, cartridge 46 holding a disinfectant agent 47 such as an iodine resin, shown in FIG. 4, is secured in first container section 24, so that water 90 drawn into first container section 24 is isolated in such container section 24, and thus can be left in first container section 24 for the required time period for the particular disinfecting agent or agents 47 to be dispersed in the water and kill specific bacteria, viruses and/or protozoa and the like in the water. Device 10 may be gently shaken or rocked back and forth to ensure the disinfecting agent 47 completely mixes with water 90 so that the water is completely sterilized or treated by such agent. As is discussed further below, a preferred disinfecting agent is an iodine resin comprised of a multitude of granules. In addition, the disinfecting agent 47 may be provided floating free in first container section 24 either as a resin, dissolvable tablet or other form, rather than being contained in a cartridge 46 or the like. Another option is for first container section 24 to be permanently sealed with a disinfecting agent therein, whereby once the agent has been completely utilized the first container section 24 would be disposed of and a new container section would be attached to second container section 26, after which device 10 would again be ready for use.

Figure 7:
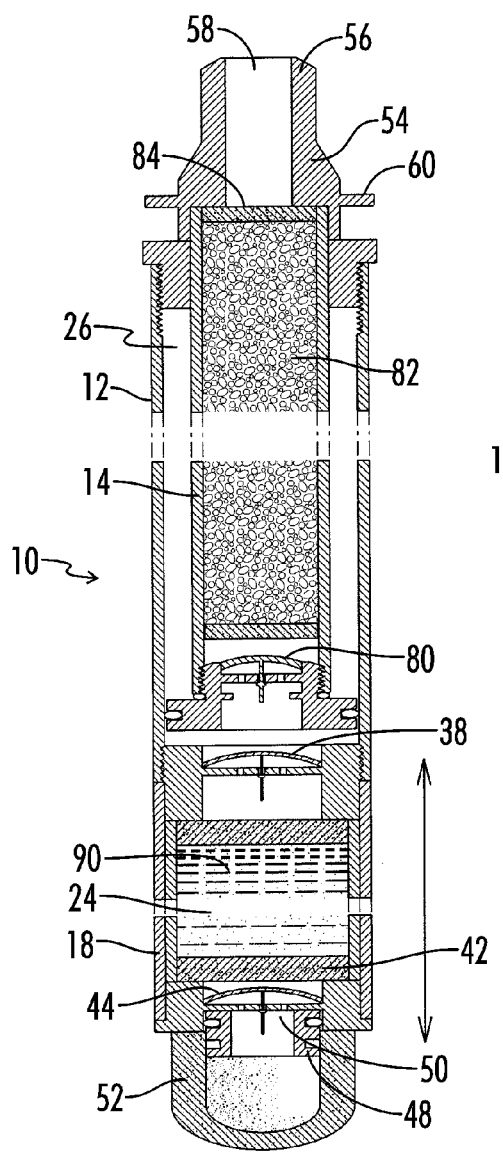
FIG. 7 is a cross-sectional view showing the inner chamber moved back inwardly into the top compartment of the outer chamber.
Figure 8:
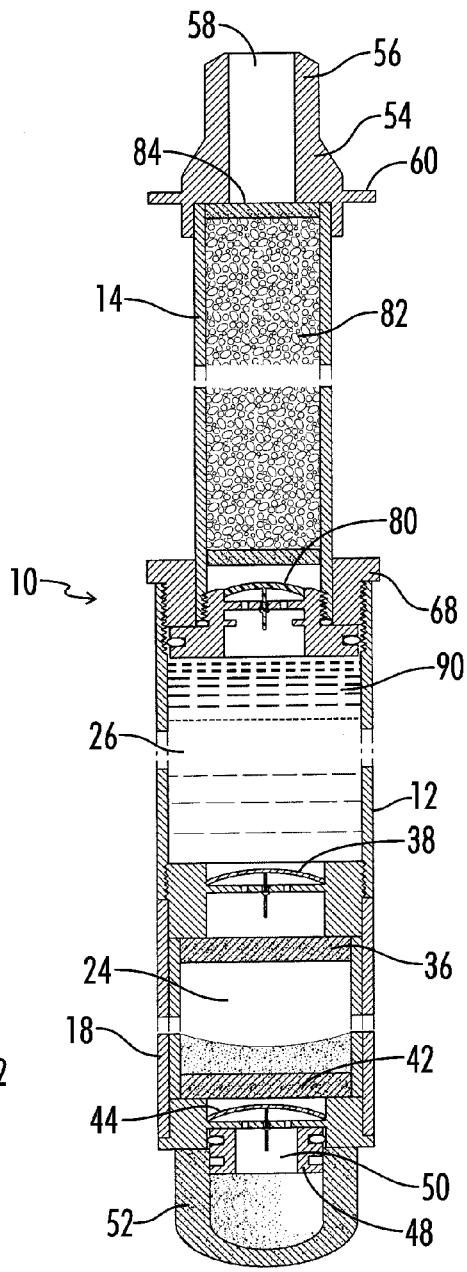
FIG. 8 is a cross-sectional view showing water drawn into the top compartment of the outer chamber.
Figures 9, 10:
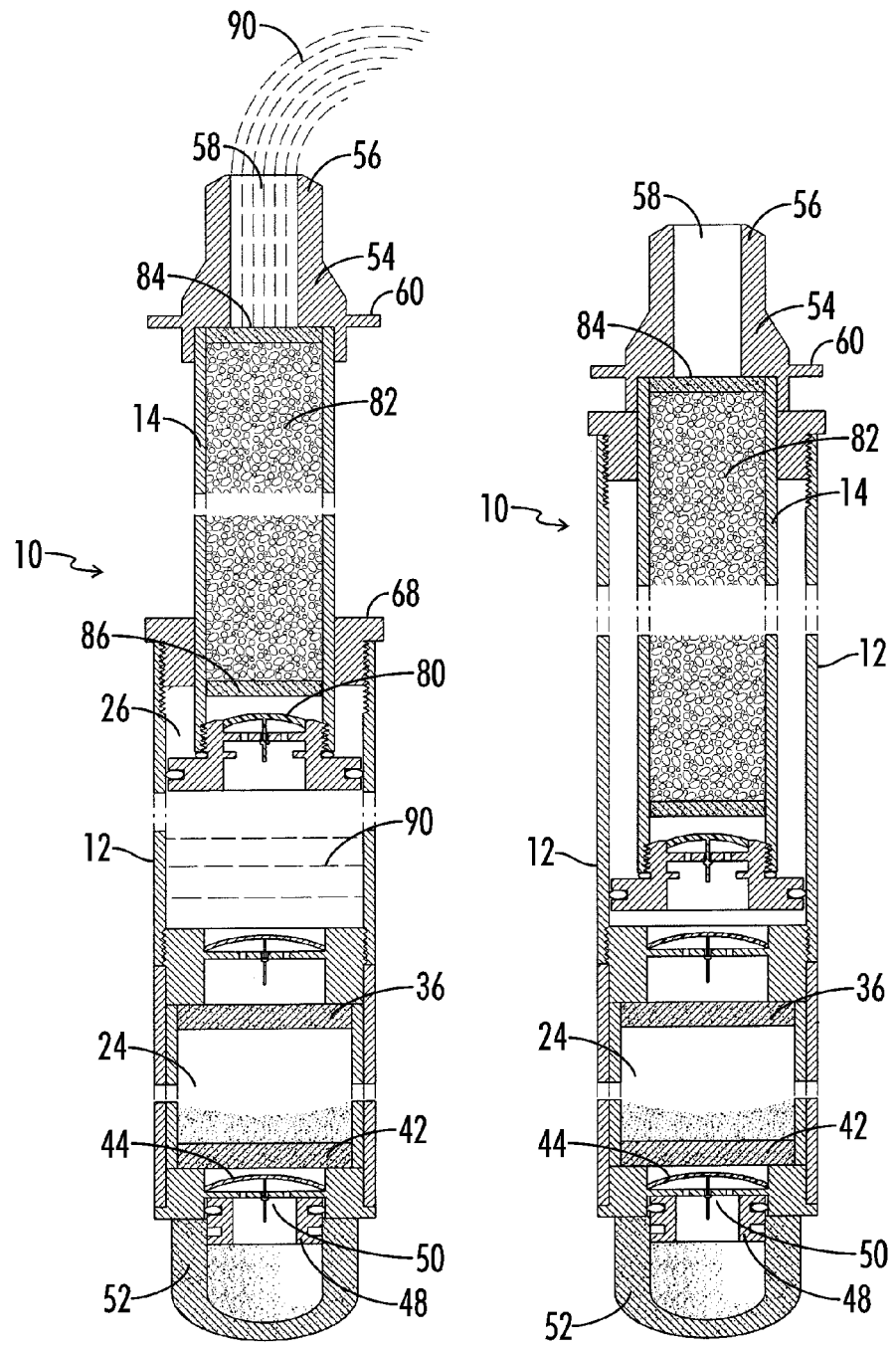
FIG. 9 is a cross-sectional view showing water being drawn out of the mouthpiece of the inner chamber.
FIG. 10 is a cross-sectional view showing the position of the chambers after water is drawn out through the mouthpiece of the inner chamber.

After water 90 has been immersed in disinfecting agent 47 in first container section 24 for the required time period to sterilize such water either by destroying or rendering inert contaminants in the water, typically via an electro-chemical reaction, and as shown in FIG. 7, inner chamber 14 is urged downwardly again back into second container section 26 of outer chamber 12, with the air in second section 26 being prevented from flowing downwardly into first container section 24 by one way check valve 38, and thus is purged from first container section 24 by being caused to flow through check valve 80 in inner chamber 14 and then out orifice 58 in mouthpiece 56. Then, as shown in FIG. 8, inner chamber 14 is again moved upwardly out of second container section 26 of outer chamber 12, causing water 90 in first container section 24 to be drawn upwardly into second container section 26, passing through filter member 36 and one way valve 38. Similar to filter member 42, filter member 36 in one embodiment is a screen filter made of polypropylene and has a 150 micron pore size, which is small enough to keep any loose resins or the like in first container section 24, although filters having larger and more preferably smaller micron pores sizes may be utilized. Water 90 is thus now physically disassociated from the granular disinfecting agent 48 in first container section 24, which granular or particulate portions remain in first container section 24, although dissolved disinfecting agent may still be contained in water 90. Next, as shown in FIG. 9, inner chamber 14 is again urged downwardly into second container section 26 of outer chamber 12, and as this occurs the positive force or pressure generated causes water 90 to pass upwardly though valve 80 and filter member 36 which in one embodiment is a screen filter made of polypropylene into inner chamber 14, and eventually through filter material 82 which is preferably a granular activated carbon bed, and out orifice 58 through mouthpiece 56, where it may be consumed. While in FIG. 9 device 10 is shown with inner chamber 14 being pulled upwardly, device 10 could also be turned upside down while the inner chamber 14 is being moved out of second container section 26 of outer chamber 12, which allows gravity to aid in forcing the water 90 through filter material 82 and out mouthpiece 56, where the clean water may be collected in a sterile bottle, drinking cup, or the like for immediate or later consumption. Preliminary reduction of contaminants using pre-filter 52 and disinfecting agent 48, as well as filter members 36, 42, and 86 further allows the adsorptive process of the activated carbon to better capture any remaining harmful and potentially elusive contaminants. After water 90 has been drawn out of inner chamber 14, as shown in FIG. 10 the inner chamber 14 may then again be moved back into second container section 26 of outer chamber 12 and readied to be reused by repeating the steps above. Thus, the pump action provided by the movement of inner chamber 14 with respect to outer chamber 12 creates both a vacuum initially which creates a strong suction that draws water through the pre-filter 52 into the first container section 24, as well a strong pump stroke which is used to move the sterilized and purified water out of the device and which maximizes the post filtering process.

FIGS. 11-12 illustrate an alternative embodiment of water disinfecting and purifying device 10, which is essentially identical to the previously described embodiment except the disinfecting agent 47 is housed in a permeable sack 110 rather than a cartridge 46. Alternatively, as indicated above, the disinfecting agent 47 may be free floating in first container section 24 of chamber 12. The disinfecting agent or antibiotic substance 47 as in the previous embodiment is preferably an ion exchange resin of a type known by those skilled in the art to be useful for water purification. A suitable ion exchange resin where iodine serves as the active disinfecting agent and where the concentration of diatomic iodine introduced into the water to be sterilized is acceptable so that such disinfected water is ready for use as drinking water is available from Safe Life Corporation headquartered in San Diego, Calif. However, a wide range of other resins and antibiotic substances can be placed in first container section 24 of chamber 12 and utilized with the present invention, which enables device 10 to be customized to treat particular contaminated water conditions in different regions or the like. For example, if a certain water supply is known to be contaminated with arsenic, an arsenic removal agent such as Purolite "Arsenx" resin will preferably be added to first container section 24 to remove arsenic as well as some other metals from the water. Another preferred filter media is the KDF-55 filter media manufactured by Sun Water Systems, Inc. and consists of finely granulated copper and zinc alloys which allows an oxidation-reduction reaction to occur when water passes through said media, converting previously harmful contaminants such as chlorine, heavy metals, and microbiological contaminants into far less harmful, or even harmless, elements. It is also believed use of such filter media or a similar media also reduces the amount of scaling and bacterial growth on the activated carbon filter media in inner chamber 14, thereby increasing the useful life of such media. The use of a nonliving biomass such as peat moss or peat moss beads as sorbents for metal ions to remove heavy metals from the water is also preferred, particularly in combination with iodine/resin. The peat moss can be placed in either first container section 24 or second container section 26 of outer chamber 12, and the water then maintained in such section of the chamber for the recommended time to cleanse the metals from solution.

FIG. 13 illustrates an alternative embodiment of outer chamber 12, wherein rather than first container section 24 and section 26 being separable by threads with insert or plug 28 connected end-to-end along the upper end of first container section 24 as shown in FIG. 4, insert or plug 112 is rigidly secured in chamber 12 so as to divide such chamber into first and second container sections 24 and 26. Such arrangement is somewhat more preferred in smaller versions of the present invention, where the overall length and size of the chambers still allows for easy storage and transportation.

FIG. 14 illustrates another embodiment of the present invention whereby device 10 is utilized with a water container 120 rather than drawing water directly into the device from a contaminated stream or the like. A significant difference in such embodiment is that first container section 124 of outer chamber 12 is removed from the bottom end of second container section 126, and is not utilized in such arrangement. Rather, disinfectant agent 47 in pouch 110 (or alternatively cartridge 46, not shown) is placed directly in water container 120 holding contaminated water supply 90. In addition, while device 10 could be manually held and used to draw water from container 120, preferably device 10 is provided with an additional cap assembly 122 which is secured around rim section 70 of collar member 68 connected to the upper end of first container section 26. Cap assembly also includes threads 124 which are engaged with threads 126 on water container 120, so that when tightened on threads 126 cap assembly 120 secures second container section 26 of device 10 to water container 120, while inner chamber 14 is free to telescopingly move with respect to outer chamber 12. As a result, as shown in FIG. 14, after packet 110 has been left in water 90 in container 120 for the required time period so that the water is sterilized using the desired disinfectant agent or agents, when inner chamber 14 is telescoped upwardly, water 90 in container 120 is drawn into second container section 26, passing through filter member 36 and one-way valve 38. Then, inner chamber 14 is again moved downwardly in second container section 26 of outer chamber 12, such water then is forced to pass into inner chamber 14, passing through one-way check valve 80, and eventually into filtering material (granular activated carbon) 82, where any remaining particles and contaminants are captured, and then out orifice 58 in mouthpiece 56 where such water is now purified and ready for consumption or other use.

While several of the embodiments of the present invention have been described in some detail, it will be understood that numerous additions and alterations can be made to such device, all of which it is believed fall within the intended scope of such invention. One such alteration is that pre-filter 52 can be arranged so that it is threadly removable from the lower end of outer chamber 12, so that such pre-filter can be more easily cleaned or changed as desired. In addition, it has been found that cap member 54 with mouthpiece 56 can also be arranged so that it can be threadably disassociated from the upper end 20 of inner chamber 14. This allows the user to more easily attend to the activated carbon bed 82 adjacent the inner surface of cap member 54, and the container holding carbon 82 may also be detachable from cap member 54 so that the used carbon granules can be removed and such container filled with a fresh supply of activated carbon. Another advantage of such arrangement is that pre-filter 52 could attached to upper end 20 of inner chamber 14 instead of cap member 54, after which a supply of fresh or purified water could be drawn through device 10 and out the upper end 20 of inner chamber 14, causing such clean water to be forced through pre-filter 52 in a reverse direction and thus cleaning sediments and other debris from the pores of the pre-filter and readying it for continued used. This would eliminate the need for carrying a small brush to clean the surface of the pre-filter, and in fact it is believed would better clean such pre-filter than could be accomplished manually using a brush. The present inventor also contemplates that test strips for a particular chemical or agent such as iodine test strips could be provided with device 10, which would allow the user to test the water emitted from the device for a particular contaminant such as iodine, to determine whether the device is working properly or may require some maintenance or cleaning. It has also been found in tests of one embodiment that the activated carbon removes one hundred percent of the iodine in the water passed through the present inventor's device, where the iodine resin used only release small amounts of iodine into the liquid suspension. In addition, the iodine that becomes embedded in the activated carbon bed or matrix creates a "bacterial static" condition that inhibits the growth of bacteria, viruses, mold, and the like on the carbon granules during period of nonuse of the device in a dark storage situation. In another embodiment, where the water being drawn through device 10 is nonturbid, it has been found that the pre-filter is not required, and thus where it is known that the device it to be used in such nonturbid water circumstances, the pre-filter does not have to be carried by the user. In addition, while the outer chamber has been described as having two container sections, in other embodiments either outer chamber or inner chamber may be divided into one or more additional compartments or sections to provide a solution to a particular water contamination issue or provide sterilization or treatment in an isolated environment using a plurality of disinfecting or antibacterial agents. Other improvements, variations, and alternative methods of use will also be evident from the structure and currently described modes of use.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

We claim:

1. A portable water purification apparatus comprising:
   (a) a first chamber having an entrance opening into which water to be purified may be drawn by suction (or negative pressure), and an exit opening, said first chamber being divided into at least two separated compartments, said entrance opening leading to a different compartment from said exit opening,
   (b) a second chamber into which the water from the first chamber can be forced through an inlet, by a pumping action (or positive pressure),
   (c) one of the compartments of said first chamber adapted to hold a disinfecting agent, and said second chamber adapted to hold a micro-filter through which water can be forced by said pumping action to an outlet for purified water, and (d) appropriate check valves provided at the entrance in said first chamber, at the inlet to said second chamber, and between each of said at least two separated compartments of the first chamber, to allow passage of water in a direction from the exterior into the first chamber, through said at least two compartments in said first chamber, and into said second chamber, but not in the reverse direction (e) a preliminary filtration filter securable to said first chamber over the entrance opening to said first chamber, said preliminary filtration filter also being threadably securable over the outlet to said second chamber when it is desired to backflush clean water through said preliminary filtration filter to unclog and clean said filter.

2. A portable water purification apparatus in accordance with claim 1 wherein said two compartments of the first chamber may be physically associated and disassociated from each other.

3. A portable purification apparatus in accordance with claim 1 additionally comprising a mouthpiece which is securable over the outlet to the second chamber for use in directing water forced through the micro-filter into the mouth of the operator of the apparatus.

4. A portable purification apparatus in accordance with claim 1 wherein the second chamber is slideable within one of the at least two compartments of the first chamber to provide both an initial negative pressure at the entrance opening of the first chamber for drawing water into the first chamber as the second chamber is withdrawn partially from the first chamber, and to provide positive pressure in the second chamber as said second chamber is moved inwardly into said at least one compartment of the first chamber.

5. A portable purification apparatus in accordance with claim 4 in which the first and second chambers are in the form of close fitting tubular elements with the second chamber in sliding engagement with the first chamber.

6. A portable purification apparatus in accordance with claim 5 wherein the walls of the tubular elements are transparent or translucent to allow the operator to monitor the internal operation.

7. A portable water purification apparatus in accordance with claim 5 wherein there is a flexible gasket means between the walls of the tubular elements to seal against leakage of water.

8. A portable water purification apparatus in accordance with claim 2 in which said compartments are interchangeable.

9. A portable water purification apparatus in accordance with claim 2 in which said apparatus is customizable to treat water supplies containing particular contaminants by interchanging said compartments and the disinfecting and filtering agents provided.

10. A portable water purification apparatus in accordance with claim 9 in which one of the compartments is permanently sealed and contains a disinfecting agent whereby once the agent has been depleted the compartment is disposed of and replaced with a new compartment section.

11. A portable water purification apparatus in accordance with claim 3 in which said mouthpiece is provided as a cap member having an internal orifice through which liquid can exit said second chamber, and a peripheral lip to facilitate grasping said second chamber and moving it in a telescoping manner with respect to said first chamber.

12. A portable water purification apparatus in accordance with claim 1 in which said preliminary filtration filter has a pore size of less than ten microns.

* * * * *